United States Patent
Tsuchiya et al.

(10) Patent No.: US 12,500,510 B2
(45) Date of Patent: Dec. 16, 2025

(54) POWER CONVERTER AND AIR CONDITIONER

(71) Applicant: Mitsubishi Electric Corporation, Tokyo (JP)

(72) Inventors: Atsushi Tsuchiya, Tokyo (JP); Kazunori Hatakeyama, Tokyo (JP); Yuichi Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 145 days.

(21) Appl. No.: 18/563,425

(22) PCT Filed: Jul. 28, 2021

(86) PCT No.: PCT/JP2021/027914
§ 371 (c)(1),
(2) Date: Nov. 22, 2023

(87) PCT Pub. No.: WO2023/007619
PCT Pub. Date: Feb. 2, 2023

(65) Prior Publication Data
US 2024/0333134 A1 Oct. 3, 2024

(51) Int. Cl.
*H02P 21/36* (2016.01)
*H02M 1/12* (2006.01)
(Continued)

(52) U.S. Cl.
CPC ......... *H02M 1/126* (2013.01); *H02M 7/5388* (2013.01); *H02P 27/085* (2013.01)

(58) Field of Classification Search
CPC .......... H02M 5/458; H02M 1/12; H02M 1/14; H02M 1/15; H02M 7/4826; H02M 1/0012;
(Continued)

(56) References Cited

U.S. PATENT DOCUMENTS

2014/0328091 A1* 11/2014 Sakakibara ............. H02M 1/15
363/37
2015/0256095 A1* 9/2015 Ohta ................... H02P 21/0003
363/37
(Continued)

FOREIGN PATENT DOCUMENTS

EP 2713502 A1 4/2014
JP 2006-271083 A 10/2006
(Continued)

OTHER PUBLICATIONS

Extended European Search Report dated Jul. 22, 2024 issued for the corresponding European Patent Application No. 21951825.5.
(Continued)

*Primary Examiner* — Kawing Chan
*Assistant Examiner* — Charles S Laughlin
(74) *Attorney, Agent, or Firm* — Posz Law Group, PLC (57) ABSTRACT

A power converter including: a non-boost rectifier circuit that converts a first alternating-current voltage into a direct-current voltage; a reactor connected to the rectifier circuit; a capacitor that smooths a direct-current voltage; an inverter that is connected in parallel to the capacitor, converts the smoothed direct-current voltage into a second alternating-current voltage having desired voltage and frequency, and outputs the second alternating-current voltage to a motor; and a controller that controls an operation of the inverter. Capacitances of the reactor and the capacitor are set such that a resonance frequency of a filter circuit including the reactor and the capacitor is smaller than a first electrical angular frequency based on a voltage command when the controller controls an operation of the inverter such that the second alternating-current voltage is maximized in a range not causing overmodulation.

5 Claims, 12 Drawing Sheets

(51) Int. Cl.
*H02M 7/5388* (2007.01)
*H02P 21/20* (2016.01)
*H02P 27/08* (2006.01)

(58) Field of Classification Search
CPC .. H02M 1/0022; H02M 1/0025; H02M 5/297; H02M 5/4585; H02M 7/53871; H02M 7/53875; H02P 21/05; H02P 27/06; H02P 27/08; H02P 21/0003; H02P 21/22
See application file for complete search history.

(56) References Cited

U.S. PATENT DOCUMENTS

| | | | |
|---|---|---|---|
| 2017/0117816 A1* | 4/2017 | Ohta | H02P 27/08 |
| 2017/0264186 A1* | 9/2017 | Shimura | H02M 1/32 |
| 2020/0389117 A1* | 12/2020 | Takaoka | H02M 7/537 |
| 2024/0171109 A1 | 5/2024 | Miyajima | |

FOREIGN PATENT DOCUMENTS

| | | |
|---|---|---|
| JP | 2009-232591 A | 10/2009 |
| JP | 2017-131094 A | 7/2017 |
| JP | 2020-078198 A | 5/2020 |
| JP | 2021-069187 A | 4/2021 |

OTHER PUBLICATIONS

Gath et al., "Designing LC Filters for AC-motor Drives", Industry Applications Conference, 1995, Thirtieth IAS Annual Meeting, IAS '95., Conference Record of the 1995 IEEE, vol. 2, pp. 1050-1052, XP010193117, DOI 10.1109/IAS.1995.530418.

Bae et al., "Damping Control Strategy for the Vector Controlled Traction Drive", European Conference on Power Electronics and Applications, 2001, pp. 1-9, XP001052022.

International Search Report of the International Searching Authority mailed Oct. 12, 2021 in corresponding International Patent Application No. PCT/JP2021/027914 (and English translation).

* cited by examiner

POWER CONVERTER AND AIR CONDITIONER

CROSS REFERENCE TO RELATED APPLICATION

This application is a U.S. national stage application of PCT/JP2021/027914 filed on Jul. 28, 2021 the contents of which are incorporated herein by reference.

FIELD

The present disclosure relates to a power converter that performs power conversion and an air conditioner.

BACKGROUND

Conventionally, by converting an alternating-current power supply voltage into a direct-current voltage, further converting the direct-current voltage into a desired alternating-current voltage and outputting the alternating-current voltage, an operation of an electric motor or the like is controlled. Patent Literature 1 discloses a technique for an electric motor control device that includes a plurality of AC-DC converters, a plurality of smoothing capacitors, a plurality of single-phase inverters, and the like, and controls an operation of an electric motor. As a reactor and a smoothing capacitor used in a general motor control device, those larger than other electric components are often used. In a general motor control device, when a reactor and a smoothing capacitor included in an AC-DC converter are made to have a small capacitance in order to downsize the device, a resonance frequency of a filter circuit including the reactor and the smoothing capacitor and a voltage pulsation frequency of a single-phase inverter are close to each other, and a resonance phenomenon may occur. In order to suppress such a resonance phenomenon, the motor control device of Patent Literature 1 is provided with a boosting chopper circuit as a circuit having a damping effect.

CITATION LIST

Patent Literature

Patent Literature 1: Japanese Patent Application Laid-open No. 2006-271083

SUMMARY OF INVENTION

Problem to be Solved by the Invention

However, according to the conventional technique described above, there has been a problem of an increase in size of the device due to the addition of the boosting chopper circuit.

The present disclosure has been made in view of the above, and an object thereof is to obtain a power converter capable of suppressing occurrence of a resonance phenomenon while suppressing an increase in size of the converter.

Means to Solve the Problem

To solve the above problems and achieve the object a power converter according to the present disclosure includes: a non-boost rectifier circuit configured to convert a first alternating-current voltage into a direct-current voltage; a reactor connected to the rectifier circuit; a capacitor configured to smooth the direct-current voltage; an inverter connected in parallel to the capacitor, and configured to convert the smoothed direct-current voltage into a second alternating-current voltage having desired voltage and frequency and configured to output the second alternating-current voltage to a motor; and a controller configured to control an operation of the inverter. Capacitances of the reactor and the capacitor are set such that a resonance frequency of a filter circuit is smaller than a first electrical angular frequency, the filter circuit including the reactor and the capacitor, the first electrical angular frequency being based on a voltage command when the controller controls an operation of the inverter such that the second alternating-current voltage is maximized in a range not causing overmodulation.

Effects of the Invention

The power converter according to the present disclosure has an effect of suppressing occurrence of a resonance phenomenon while suppressing an increase in size of the converter.

DESCRIPTION OF EMBODIMENTS

Hereinafter, a power converter and an air conditioner according to embodiments of the present disclosure will be described in detail with reference to the drawings.

First Embodiment

Figure 1:
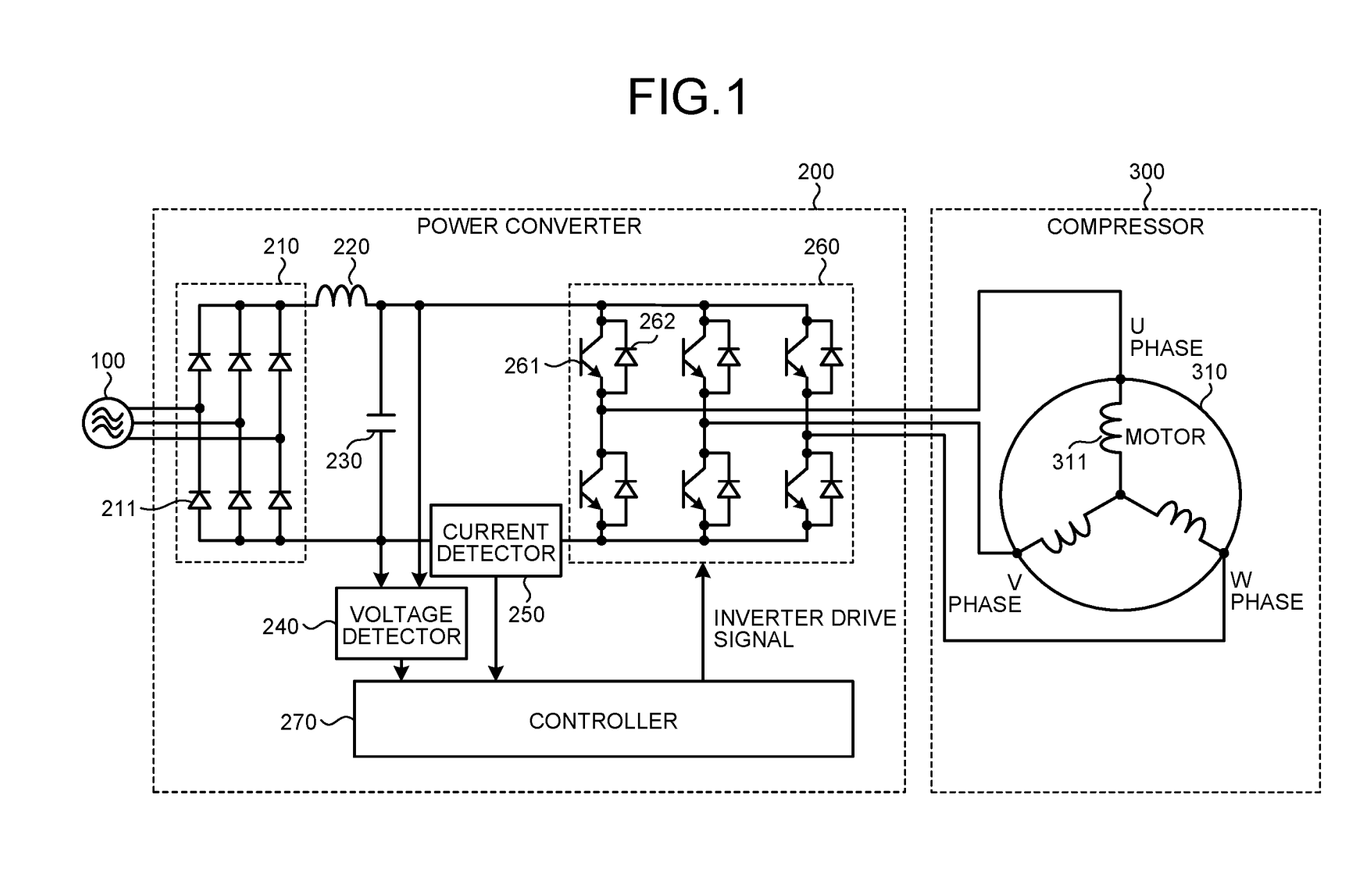
FIG. 1 is a first diagram illustrating a configuration example of a power converter according to a first embodiment.

FIG. 1 is a first diagram illustrating a configuration example of a power converter 200 according to a first embodiment. The power converter 200 is connected to an alternating-current power supply 100 and a compressor 300, converts an alternating-current voltage output from the alternating-current power supply 100 into a direct-current voltage, and further converts the direct-current voltage into an alternating-current voltage having desired voltage and frequency and outputs the alternating-current voltage to the compressor 300. In the following description, the alternating-current voltage output from the alternating-current power supply 100 is referred to as a first alternating-current voltage, and the alternating-current voltage output from the power converter 200 is referred to as a second alternating-current voltage. The power converter 200 includes: a rectifier circuit 210; a reactor 220; a capacitor 230; a voltage detector 240; a current detector 250; an inverter 260, and a controller 270.

The rectifier circuit 210 includes a plurality of diodes 211, six diodes 211 in the example of FIG. 1, and converts the first alternating-current voltage output from the alternating-current power supply 100 into a direct-current voltage and outputs the direct-current voltage. In the present embodiment, the rectifier circuit 210 is a non-boost circuit.

In the example of FIG. 1, the reactor 220 has one end connected to an output end of the rectifier circuit 210 and another end connected to the capacitor 230. Note that an installation position of the reactor 220 in the power converter 200 is not limited to the example of FIG. 1.

In the example of FIG. 1, one end of the capacitor 230 is connected to the output end of the rectifier circuit 210 via the reactor 220, and another end is connected to an output end of the rectifier circuit 210. The capacitor 230 smooths the direct-current voltage converted by the rectifier circuit 210.

The voltage detector 240 is connected to the capacitor 230, and detects a direct-current bus voltage Vdc, which is a direct-current voltage output from the capacitor 230. The voltage detector 240 outputs a detection value that is a voltage value of the direct-current bus voltage Vdc, to the controller 270.

The current detector 250 is connected between the capacitor 230 and the inverter 260, and detects a current flowing through the inverter 260. The current detector 250 outputs a detection value that is a current value of the current flowing through the inverter 260, to the controller 270.

The inverter 260 is connected in parallel to the capacitor 230, and converts the direct-current bus voltage Vdc, which is a smoothed direct-current voltage, into the second alternating-current voltage having desired voltage and frequency under the control of the controller 270. Specifically, the inverter 260 includes: six switching elements 261; and six diodes 262 connected in parallel to the switching elements 261. The inverter 260 turns ON and OFF each switching element 261 on the basis of an inverter drive signal output from the controller 270, and generates the second alternating-current voltage, that is, converts the direct-current bus voltage Vdc, which is a smoothed direct-current voltage, into the second alternating-current voltage. The inverter 260 outputs the second alternating-current voltage to a motor 310 included in the compressor 300.

The controller 270 controls an operation of the inverter 260 so as to output the second alternating-current voltage to the motor 310 of the compressor 300 connected to the inverter 260. Specifically, the controller 270: generates an inverter drive signal for controlling the operation of the inverter 260 on the basis of the detection values acquired from the voltage detector 240 and the current detector 250; and outputs the inverter drive signal to the inverter 260. Note that, although not illustrated in FIG. 1, the controller 270 may further control the operation of the inverter 260 by using a detection value that is a current value detected by a current detector that detects a current flowing from the inverter 260 to one or more phases of the motor 310.

The compressor 300 connected to the power converter 200 includes the motor 310. In the present embodiment, the motor 310 is a three-phase motor including a winding wire 311 for each phase, that is, for each of a U phase, a V phase, and a W phase.

Figure 2:
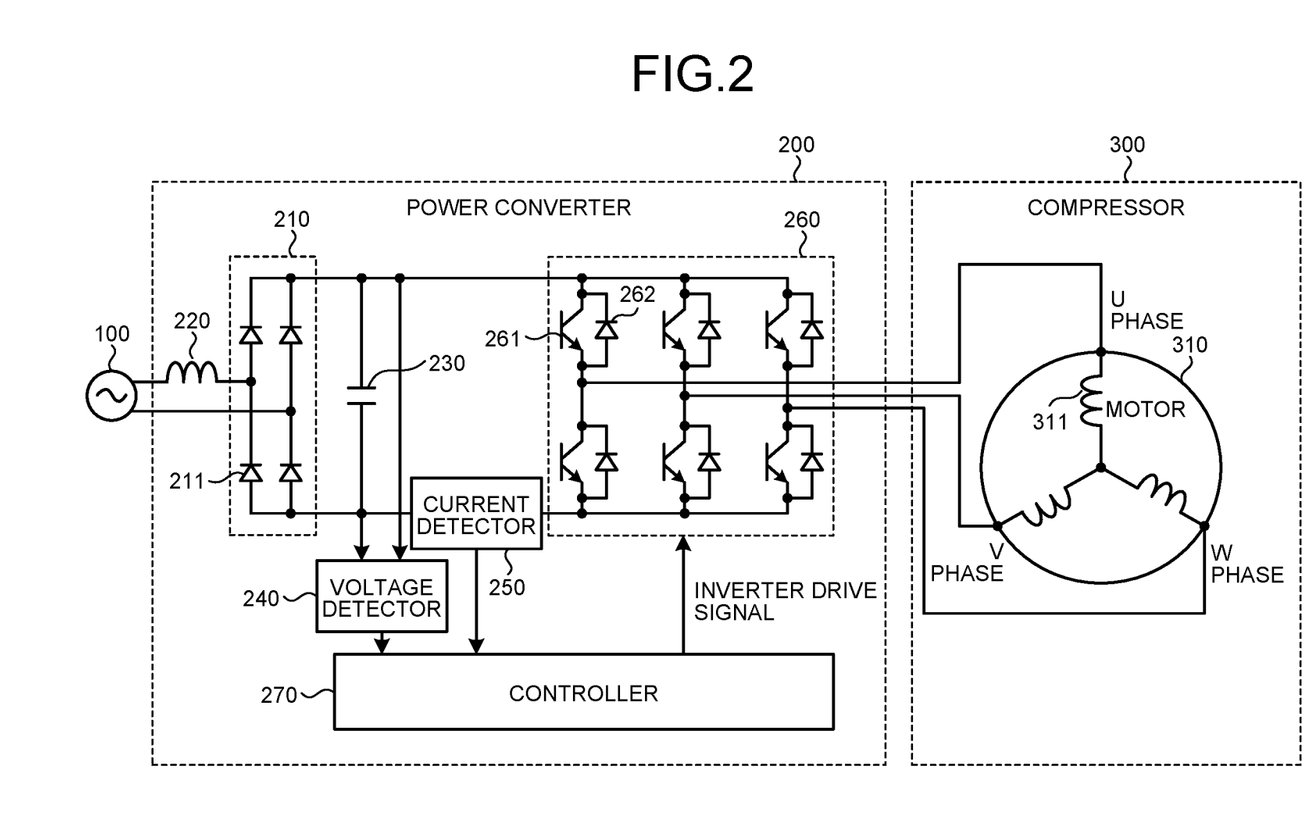
FIG. 2 is a second diagram illustrating a configuration example of the power converter according to the first embodiment.

FIG. 1 illustrates an example of a case where the alternating-current power supply 100 connected to the power converter 200 is a three-phase alternating-current power supply, but this is an example, and the present disclosure is not limited thereto. FIG. 2 is a second diagram illustrating a configuration example of the power converter 200 according to the first embodiment. As illustrated in FIG. 2, the alternating-current power supply 100 connected to the power converter 200 may be a single-phase alternating-current power supply. In this case, in the power converter 200, the rectifier circuit 210 includes four diodes 211, converts the first alternating-current voltage output from the alternating-current power supply 100 into a direct-current voltage, and outputs the direct-current voltage. Further, in the example of FIG. 2, the reactor 220 has one end connected to the alternating-current power supply 100 and another end connected to an input end of the rectifier circuit 210. Note that, when the alternating-current power supply 100 is a single-phase alternating-current power supply, an installation position of the reactor 220 in the power converter 200 is not limited to the example of FIG. 2.

Next, an operation of the power converter 200 will be described. In the power converter 200, in order to control ON/OFF of each switching element 261 of the inverter 260, the controller 270 generates an inverter drive signal for controlling ON/OFF of the switching element 261 corresponding to each phase, on the basis of a result of comparison between a voltage command for each phase and a carrier.

Figure 3:
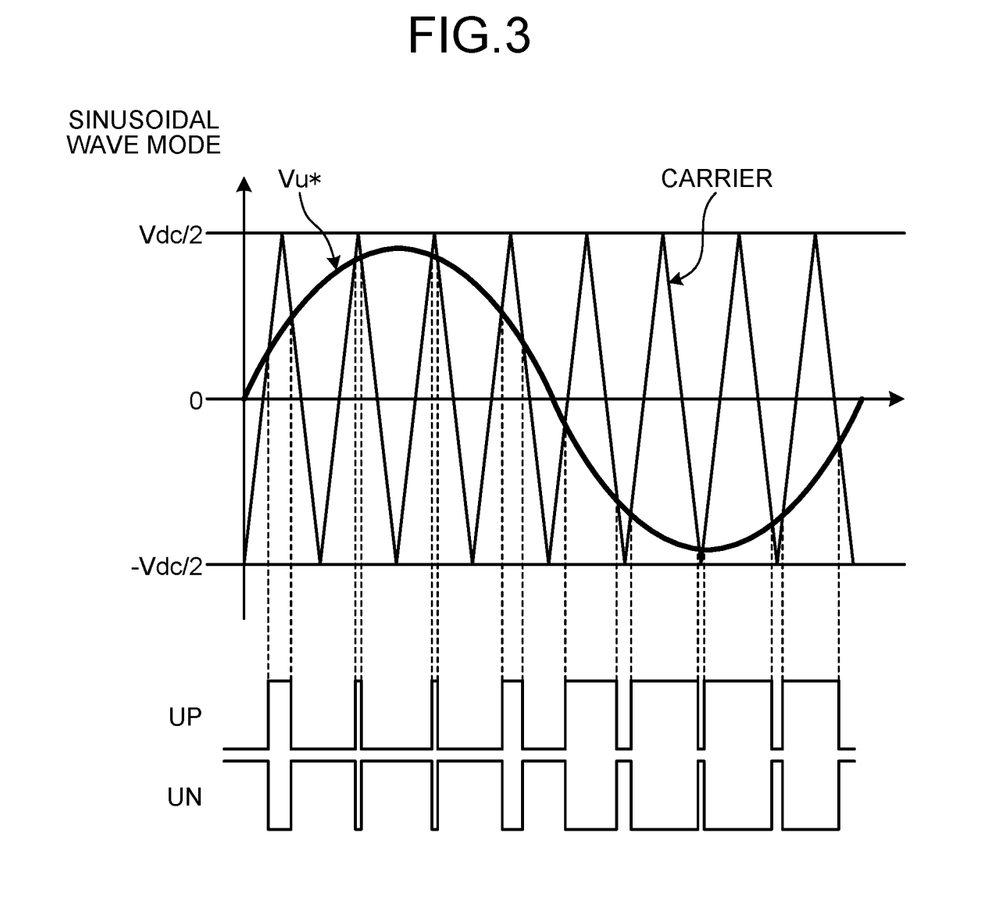
FIG. 3 is a view illustrating an operation in which a controller of the power converter according to the first embodiment generates an inverter drive signal in accordance with a voltage command in a sinusoidal wave mode.

FIG. 3 is a view illustrating an operation in which the controller 270 of the power converter 200 according to the first embodiment generates inverter drive signals UP and UN in accordance with a voltage command in a sinusoidal wave mode. FIG. 3 is a view illustrating a case where a voltage command Vu* is in the sinusoidal wave mode, and a maximum amplitude of the voltage command Vu* is Vdc/2. The controller 270 compares the voltage command Vu* for the U phase with a carrier. In a case where the carrier is larger than the voltage command Vu*, the controller 270 generates each inverter drive signal such that the inverter drive signal UP for the switching element 261 of a U-phase upper arm is high and the inverter drive signal UN for the switching element 261 of a U-phase lower arm is low. In a case where the voltage command Vu* is larger than the carrier, the controller 270 generates each inverter drive signal such that the inverter drive signal UP for the switching element 261 of the U-phase upper arm is low and the inverter drive signal UN for the switching element 261 of the U-phase lower arm is high. Similarly, although not illustrated, the controller 270 generates an inverter drive signal VP for the switching element 261 of a V-phase upper arm and an inverter drive signal VN for the switching element 261 of a V-phase lower arm, on the basis of a result of comparison between a voltage command Vv* for the V phase and the carrier. Further, the controller 270 generates an inverter drive signal WP for the switching element 261 of a W-phase upper arm and an inverter drive signal WN for the switching element 261 of a W-phase lower arm, on the basis of a result of comparison between a voltage command Vw* for the W phase and the carrier.

Figure 4:
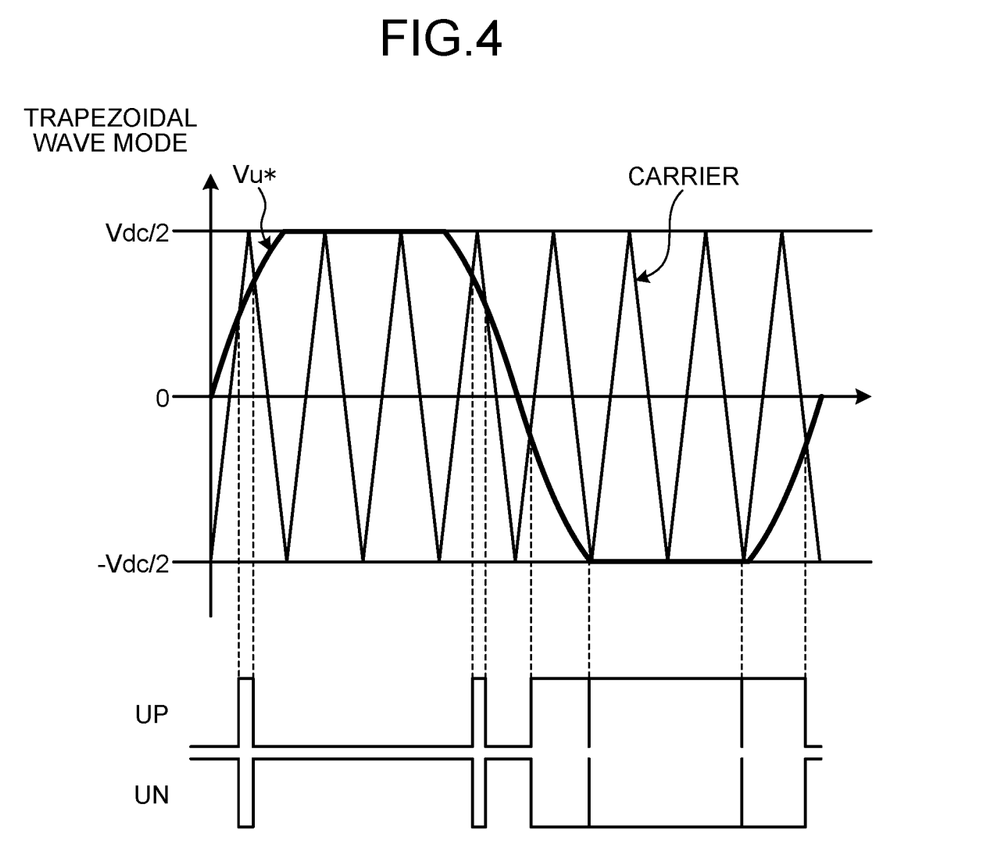
FIG. 4 is a view illustrating an operation in which the controller of the power converter according to the first embodiment generates an inverter drive signal in accordance with a voltage command in a trapezoidal wave mode.

Note that the voltage command is not limited to the shape of the sinusoidal wave. FIG. 4 is a view illustrating an operation in which the controller 270 of the power converter 200 according to the first embodiment generates the inverter drive signals UP and UN in accordance with a voltage command in a trapezoidal wave mode. FIG. 4 is a view illustrating a case where the voltage command Vu* is in the trapezoidal wave mode, and a maximum amplitude of the voltage command Vu* is Vdc/2. Similarly to the case where the voltage command is in the sinusoidal wave mode, the controller 270 generates an inverter drive signal for the switching elements 261 of the upper and lower arms of each phase, on the basis of a result of comparison between the voltage command for each phase and the carrier.

Figure 5:
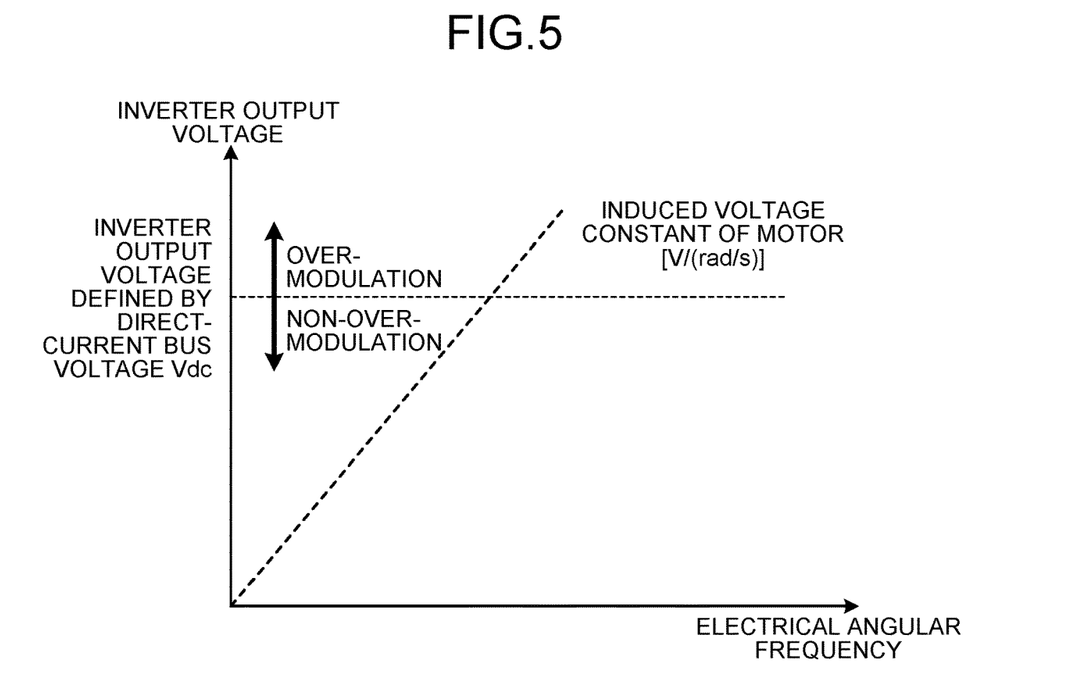
FIG. 5 is a view illustrating an induced voltage characteristic of a motor of a compressor connected to the power converter according to the first embodiment.

Here, in an output voltage of the inverter 260, that is, in the second alternating-current voltage, an overmodulation region and a non-overmodulation region that is not to be overmodulation are defined by magnitude of the direct-current bus voltage Vdc. FIG. 5 is a view illustrating an induced voltage characteristic of the motor 310 of the compressor 300 connected to the power converter 200 according to the first embodiment. In FIG. 5, a horizontal axis represents an electrical angular frequency which is an operation frequency of the motor 310 of the compressor 300, and a vertical axis represents an output voltage of the inverter 260. FIG. 5 illustrates, as the induced voltage characteristic of the motor 310, an induced voltage constant of the motor 310 based on the output voltage of the inverter 260 and the electrical angular frequency of the motor 310 of the compressor 300. In a non-overmodulation range of the output voltage of the inverter 260, the controller 270 can control the output voltage of the inverter 260 in accordance with the induced voltage constant of the motor 310 by controlling an operation of the inverter 260. However, in an overmodulation range of the output voltage of the inverter 260, the controller 270 cannot control the output voltage of the inverter 260 in accordance with the induced voltage constant of the motor 310.

Figure 6:
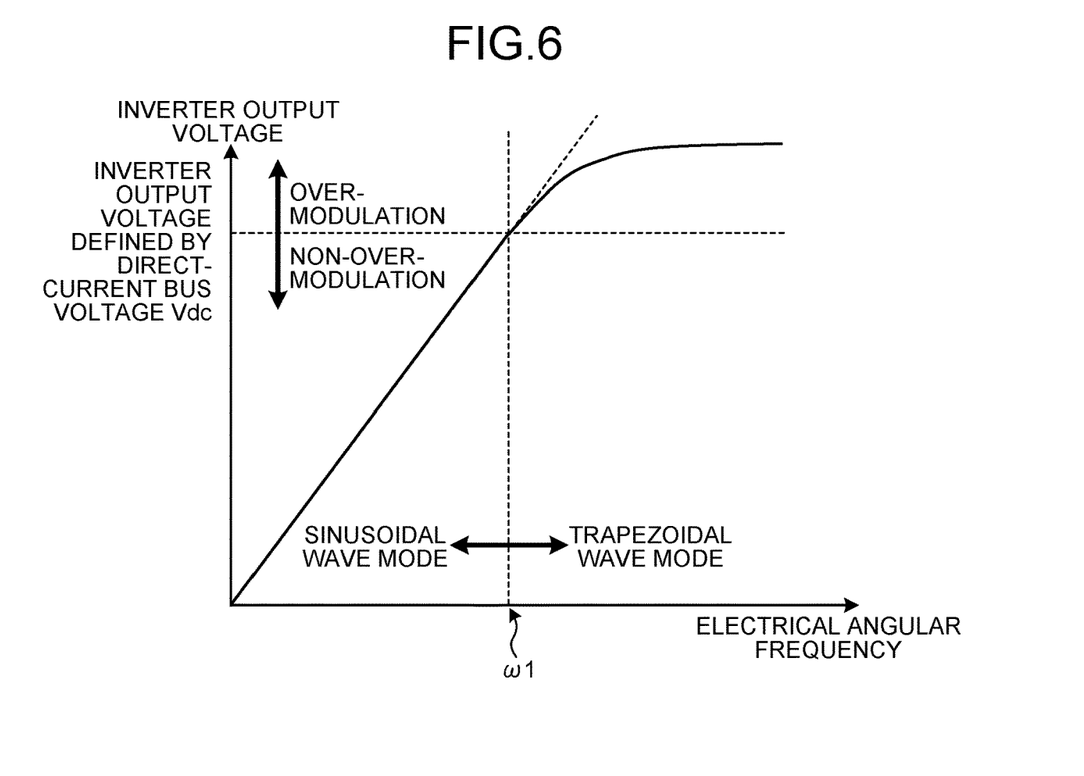
FIG. 6 is a view illustrating an example of switching of a control mode with respect to an inverter by the controller of the power converter according to the first embodiment.

FIG. 6 is a view illustrating an example of switching of a control mode with respect to the inverter 260 by the controller 270 of the power converter 200 according to the first embodiment. In FIG. 6, a horizontal axis and a vertical axis are similar to those in FIG. 5. In a non-overmodulation range of the output voltage of the inverter 260, the controller 270 can control the output voltage of the inverter 260 to desired voltage and frequency in accordance with the induced voltage constant of the motor 310, by using the voltage command in the sinusoidal wave mode illustrated in FIG. 3. Whereas, in an overmodulation range of the output voltage of the inverter 260, the controller 270 uses the voltage command in the trapezoidal wave mode illustrated in FIG. 4. However, the controller 270 cannot control the output voltage of the inverter 260 to desired voltage and frequency in accordance with the induced voltage constant of the motor 310, and causes a saturated state regardless of the electrical angular frequency which is the operation frequency of the motor 310 of the compressor 300. In such a case, generation of vibration, noise, and the like becomes a problem in the compressor 300. In FIG. 6, the electrical angular frequency, which is the operation frequency of the motor 310 of the compressor 300 corresponding to a position where the output voltage of the inverter 260 defined by the direct-current bus voltage Vdc and the induced voltage constant of the motor 310 intersect, corresponds to a first electrical angular frequency $\omega 1$ that is a six-fold component of a maximum amplitude frequency when the controller 270 controls the voltage command in the sinusoidal wave mode.

The first electrical angular frequency $\omega 1$ can be expressed by Equation (1). Note that, in Equation (1), $\omega s\_max$ is a maximum frequency at which the inverter 260 can be operated with the direct-current bus voltage Vdc input to the inverter 260, and P is the number of pole pairs of the motor 310.

$$\omega 1 = \omega s\_\max \times P \times 6 \qquad (1)$$

Note that the first electrical angular frequency $\omega 1$ can also be obtained as a six-fold component of a second electrical angular frequency determined by using the number of pole pairs of the motor 310 and the number of rotations of the motor 310 when the second alternating-current voltage is maximized in a range not causing overmodulation with the voltage command in the sinusoidal wave mode controlled by the controller 270.

As described in the background art, in general, in the power converter 200 including the reactor 220 and the capacitor 230, an LC resonance circuit, that is, a filter circuit includes the reactor 220 and the capacitor 230. In a state where the controller 270 controls the operation of the inverter 260 with the voltage command in the trapezoidal wave mode, that is, controls operation of the compressor 300, when a resonance frequency $\omega 2$ of the filter circuit becomes larger than the first electrical angular frequency $\omega 1$, vibration, noise, and the like generated in the compressor 300 further increase.

The resonance frequency $\omega 2$ of the filter circuit can be expressed by Equation (2). Note that, in Equation (2), L is a capacitance of the reactor 220, and C is a capacitance of the capacitor 230. Further, $\sqrt{(L \times C)}$ represents a square root of L×C.

$$\omega 2 = 1/(2\pi \times \sqrt{(L \times C)}) \qquad (2)$$

Figure 7:
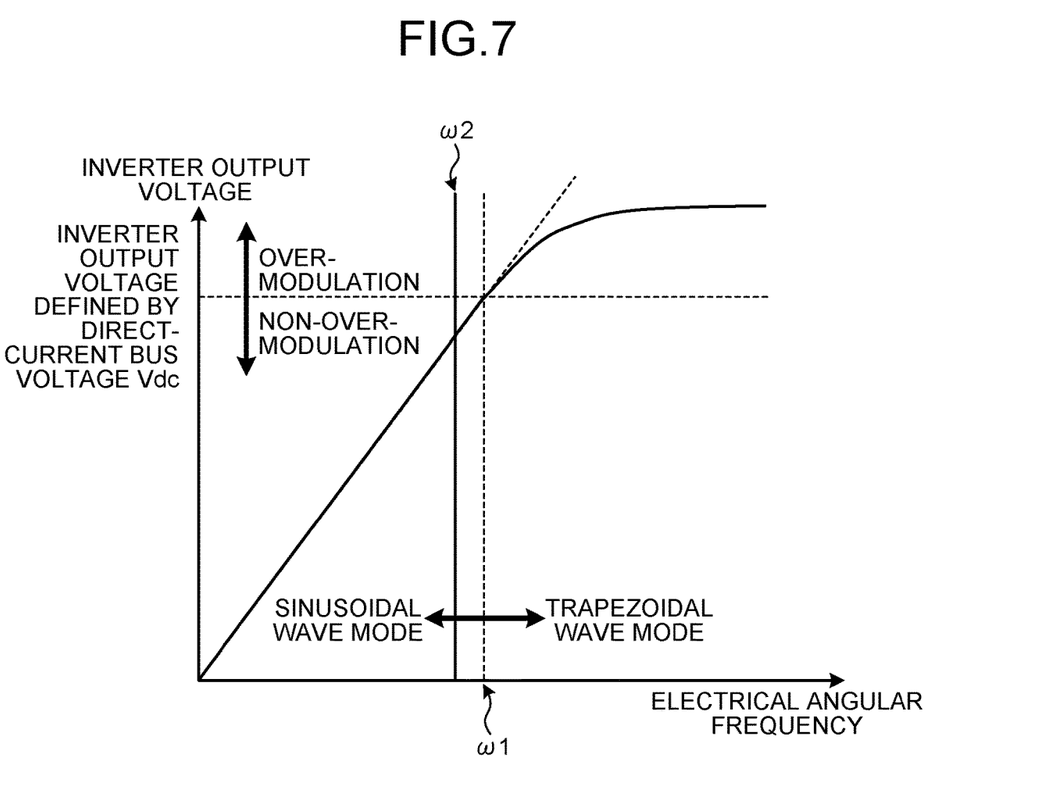
FIG. 7 is a view illustrating an example of a relationship between a first electrical angular frequency and a resonance frequency in the power converter according to the first embodiment.

Therefore, in the present embodiment, in the power converter 200, the capacitance L of the reactor 220 and the capacitance C of the capacitor 230 are set such that the resonance frequency $\omega 2$ of the filter circuit including the reactor 220 and the capacitor 230 is smaller than the first electrical angular frequency $\omega 1$ based on the voltage command when the controller 270 controls the operation of the inverter 260 such that the second alternating-current voltage is maximized in a range not causing overmodulation. FIG. 7 is a view illustrating an example of a relationship between the first electrical angular frequency ω1 and the resonance frequency ω2 in the power converter 200 according to the first embodiment. FIG. 7 is obtained by adding the resonance frequency ω2 to FIG. 6. In the power converter 200, the capacitance L of the reactor 220 and the capacitance C of the capacitor 230 are set such that the resonance frequency ω2 is smaller than the first electrical angular frequency ω1 which is a six-fold component of the second electrical angular frequency determined by using the number of pole pairs of the motor 310 and the number of rotations of the motor 310 when the second alternating-current voltage is maximized in a range not causing overmodulation with the voltage command in the sinusoidal wave mode controlled by the controller 270. As a result, the power converter 200 can suppress occurrence of the resonance phenomenon while suppressing an increase in size of the converter.

Note that, in the power converter 200, it is assumed that the capacitance L of the reactor 220 and the capacitance C of the capacitor 230 actually vary depending on each individual. Therefore, in the power converter 200, the capacitance L of the reactor 220 and the capacitance C of the capacitor 230 are set such that the maximum resonance frequency ω2 assumed in consideration of the variations in the capacitance L of the reactor 220 and the capacitance C of the capacitor 230 is smaller than the first electrical angular frequency ω1. Accordingly, the power converter 200 can suppress occurrence of the resonance phenomenon while suppressing an increase in size of the converter with high accuracy, as compared with a case where the variations in the capacitance L of the reactor 220 and the capacitance C of the capacitor 230 are not considered.

Figure 8:
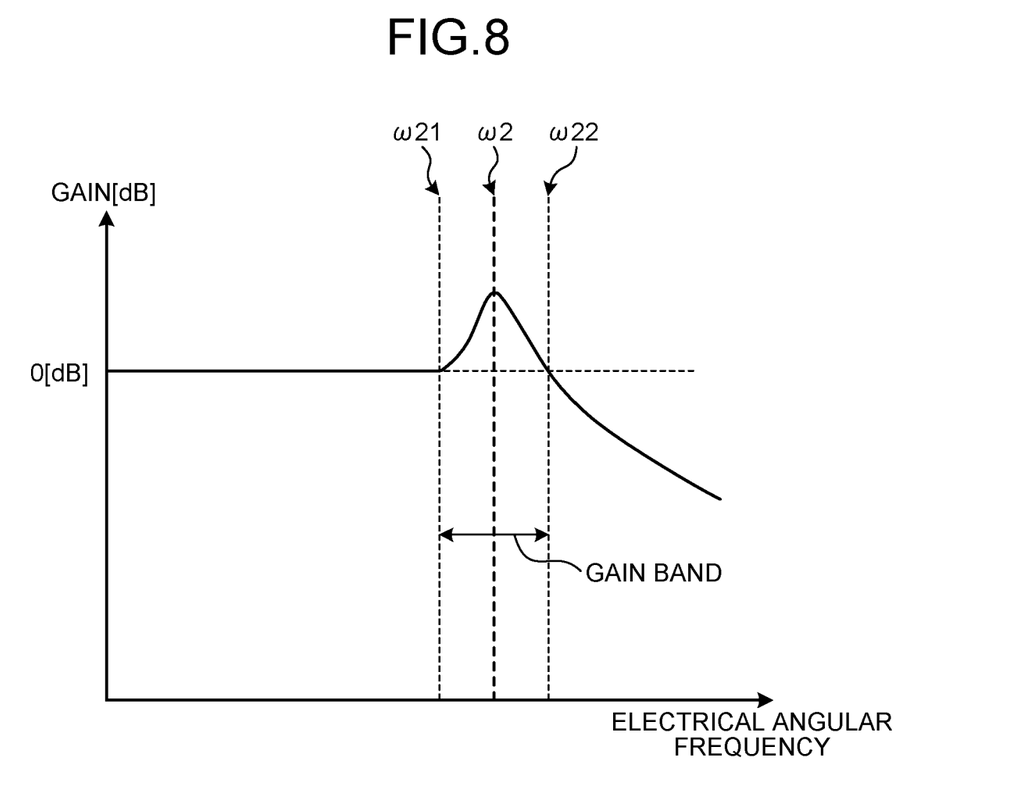
FIG. 8 is a view illustrating a characteristic of a gain of a resonance frequency according to a capacitance of a reactor and a capacitance of a capacitor included in the power converter according to the first embodiment.

Further, the resonance frequency ω2 has a gain in a band around the resonance frequency ω2. FIG. 8 is a view illustrating a characteristic of a gain of the resonance frequency ω2 according to the capacitance L of the reactor 220 and the capacitance C of the capacitor 230 included in the power converter 200 according to the first embodiment. In FIG. 8, a horizontal axis represents an electrical angular frequency which is the operation frequency of the motor 310 of the compressor 300, and a vertical axis represents a gain obtained by a filter circuit including the reactor 220 and the capacitor 230. The power converter 200 has a gain band in which the gain is zero decibel or more in a frequency band from an electrical angular frequency ω21 to an electrical angular frequency ω22 centered on the resonance frequency ω2. Therefore, in the power converter 200, the capacitance L of the reactor 220 and the capacitance C of the capacitor 230 are set such that a frequency band in a range including the resonance frequency ω2 and having the gain of zero decibel or more is smaller than the first electrical angular frequency ω1.

Figure 9:
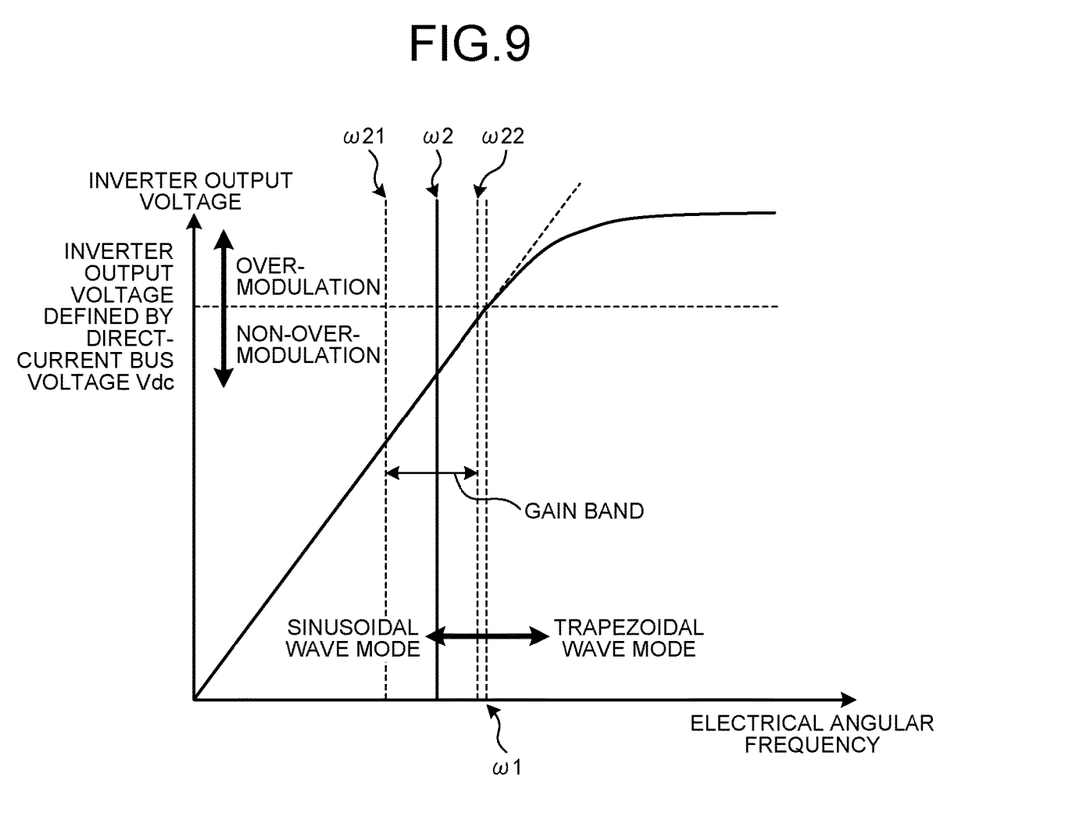
FIG. 9 is a view illustrating an example of a relationship between a first electrical angular frequency and a gain band of a resonance frequency in the power converter according to the first embodiment.

FIG. 9 is a view illustrating an example of a relationship between the first electrical angular frequency ω1 and a gain band of the resonance frequency ω2 in the power converter 200 according to the first embodiment. FIG. 9 is obtained by adding, to FIG. 7, a gain band that is a frequency band between the electrical angular frequency ω21 and the electrical angular frequency ω22. As illustrated in FIG. 9, in the power converter 200, the capacitance L of the reactor 220 and the capacitance C of the capacitor 230 are set such that the electrical angular frequency ω22 above the gain band obtained in a filter circuit including the reactor 220 and the capacitor 230 is less than the first electrical angular frequency ω1.

Figure 10:
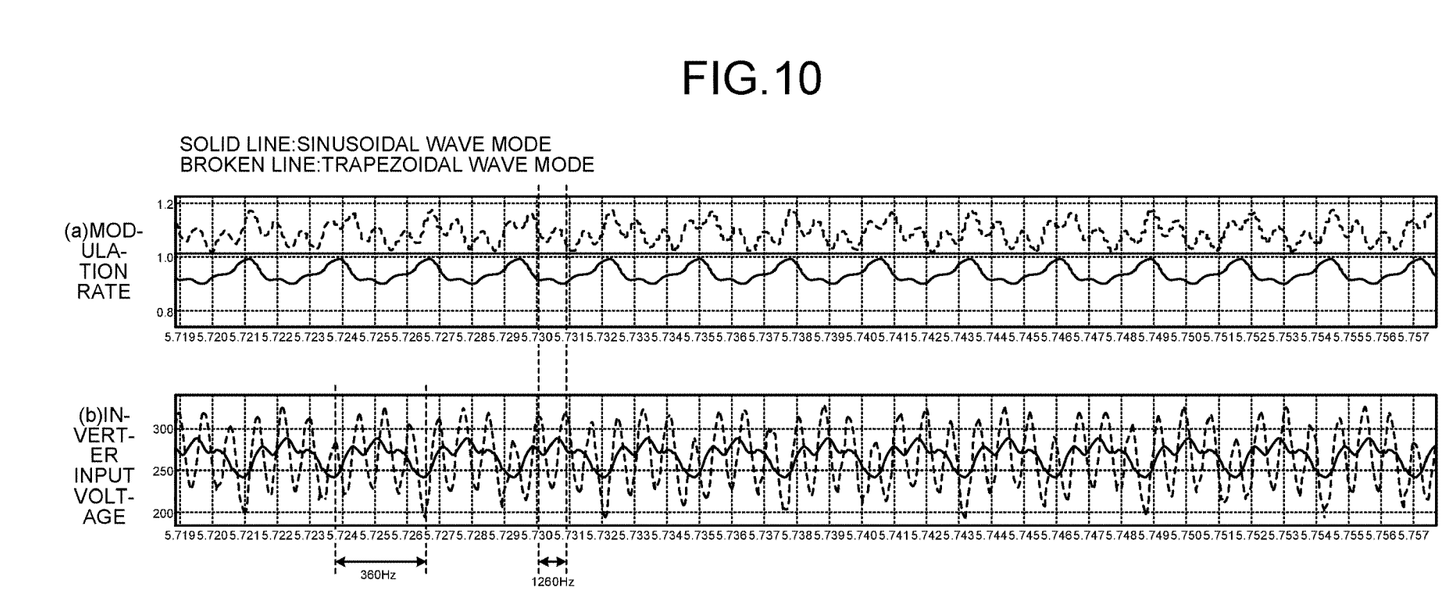
FIG. 10 is a view illustrating an example of pulsation of an inverter input voltage according to a mode of a voltage command used in the controller in the power converter according to the first embodiment.

FIG. 10 is a view illustrating an example of pulsation of an inverter input voltage according to a mode of a voltage command used in the controller 270 in the power converter 200 according to the first embodiment. FIG. 10(a) illustrates a modulation rate, and FIG. 10(b) illustrates an inverter input voltage. Further, in FIG. 10, the sinusoidal wave mode is indicated by a solid line, and the trapezoidal wave mode is indicated by a broken line. As illustrated in FIG. 10(a), the modulation rate is larger in the trapezoidal wave mode than in the sinusoidal wave mode. Further, as illustrated in FIG. 10(b), the inverter input voltage, that is, the direct-current bus voltage Vdc, which is a direct-current voltage output from the capacitor 230, has small fluctuation in the sinusoidal wave mode, but has large fluctuation in the trapezoidal wave mode. In the trapezoidal wave mode, the inverter input voltage may possibly exceeded an element withstand voltage of the capacitor 230 or the like. Further, in the trapezoidal wave mode, fluctuation of the second alternating-current voltage output from the inverter 260 to the motor 310 also increases, and generation of vibration, noise, and the like becomes a problem in the compressor 300. Therefore, in the power converter 200, the controller 270 desirably controls the operation of the inverter 260 in the sinusoidal wave mode.

Figure 11:
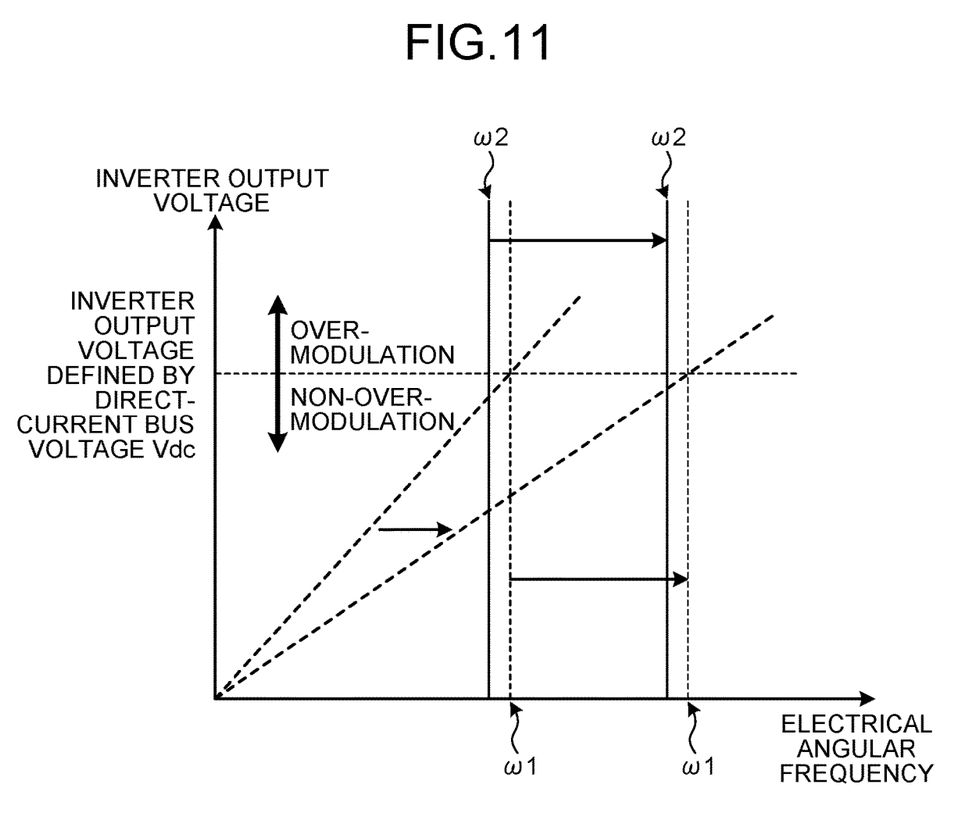
FIG. 11 is a view illustrating a relationship between an induced voltage characteristic of a motor, a first electrical angular frequency, and a resonance frequency in the power converter according to the first embodiment.

Here, as for the induced voltage characteristic of the motor 310 illustrated in FIG. 5 and the like, if a gradient of the induced voltage characteristic of the motor 310 can be changed in a lying direction, the first electrical angular frequency ω1 when the output voltage of the inverter 260 changes from non-overmodulation to overmodulation can be moved rightward, that is, in a direction of a high electrical angular frequency. If the electrical angular frequency of the first electrical angular frequency ω1 can be increased, the resonance frequency ω2 can also be increased in accordance with the first electrical angular frequency ω1. FIG. 11 is a view illustrating a relationship between the induced voltage characteristic of the motor 310, the first electrical angular frequency 1, and the resonance frequency ω2 in the power converter 200 according to the first embodiment. If the resonance frequency ω2 can be increased, the capacitance L of the reactor 220 and the capacitance C of the capacitor 230 can be further reduced as apparent from Equation (2). If the capacitance L of the reactor 220 and the capacitance C of the capacitor 230 can be further reduced, the power converter 200 can further suppress occurrence of a resonance phenomenon while suppressing an increase in size of the converter. Note that, for the motor 310, also by changing the number of turns of the winding wire 311 of the motor 310, a stacking thickness of an iron core (not illustrated) included in the motor 310, and the like in addition to the induced voltage characteristic of the motor 310, the gradient of the induced voltage characteristic of the motor 310 illustrated in FIG. 11 can be changed. Further, these requirements allowing to change the gradient of the induced voltage characteristic of the motor 310 may be combined. That is, by changing at least one of the induced voltage characteristic of the motor 310, the number of turns of the winding wire 311 of the motor 310, or the stacking thickness of the iron core of the motor 310, a setting of the capacitance L of the reactor 220 and the capacitance C of the capacitor 230 can be changed.

Figure 12:
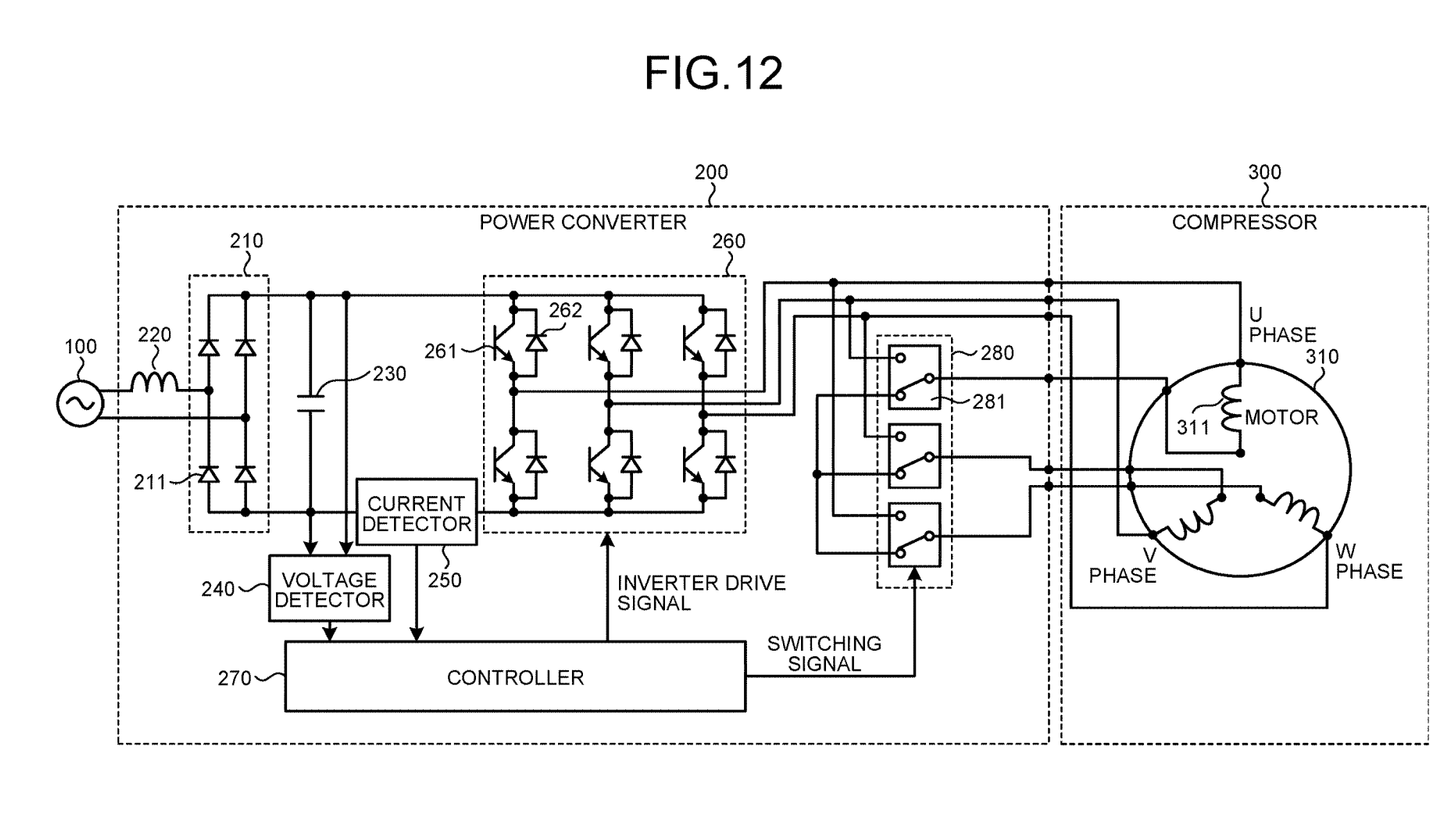
FIG. 12 is a third diagram illustrating a configuration example of the power converter according to the first embodiment.

Regarding the motor 310 of the compressor 300 connected to the power converter 200, a case where the winding wire 311 is in Y connection is illustrated in FIGS. 1 and 2, but the present disclosure is not limited thereto. The winding wire 311 of the motor 310 may be in Δ connection or may be configured to be switchable between the Y connection and the A connection. FIG. 12 is a third diagram illustrating a configuration example of the power converter 200 according to the first embodiment. In the example of FIG. 12, a switching unit 280 is added to the power converter 200 illustrated in FIG. 2. The switching unit 280 includes a switch 281 capable of switching connection of each winding wire 311 of the motor 310 for each phase of the motor 310. The controller 270 generates and outputs a switching signal instructing a connection destination of each switch 281, to the switching unit 280. For example, when the inverter output voltage is likely to be in the overmodulation region, the controller 270 can continue the operation of the motor 310 without entering the overmodulation region by switching the winding wire 311 of the motor 310 from the Y connection to the A connection. Each switch 281 of the switching unit 280 switches the connection of the winding wire 311 of the motor 310 on the basis of the switching signal from the controller 270.

As described above, according to the present embodiment, in the power converter 200, the capacitance L of the reactor 220 and the capacitance C of the capacitor 230 are set such that the resonance frequency ω2 of the filter circuit including the reactor 220 and the capacitor 230 is smaller than the first electrical angular frequency ω1 based on the voltage command when the controller 270 controls the operation of the inverter 260 such that the second alternating-current voltage is maximized in a range not causing overmodulation. As a result, the power converter 200 can suppress occurrence of the resonance phenomenon while suppressing an increase in size of the converter.

Note that, the setting of the capacitance L of the reactor 220 and the capacitance C of the capacitor 230 included in the power converter 200 in the present embodiment is not limited to the overmodulation operation of the inverter 260, and can also be applied to control of a voltage across the capacitor due to dead time including a normal operation. Further, when a scroll compressor is used as the compressor 300 to be connected, the power converter 200 has a load change smaller than that of a rotary compressor, and thus is susceptible to a voltage pulsation influence of the inverter input voltage. Therefore, the effect of suppressing vibration, noise, and the like can be obtained.

Second Embodiment

Figure 13:
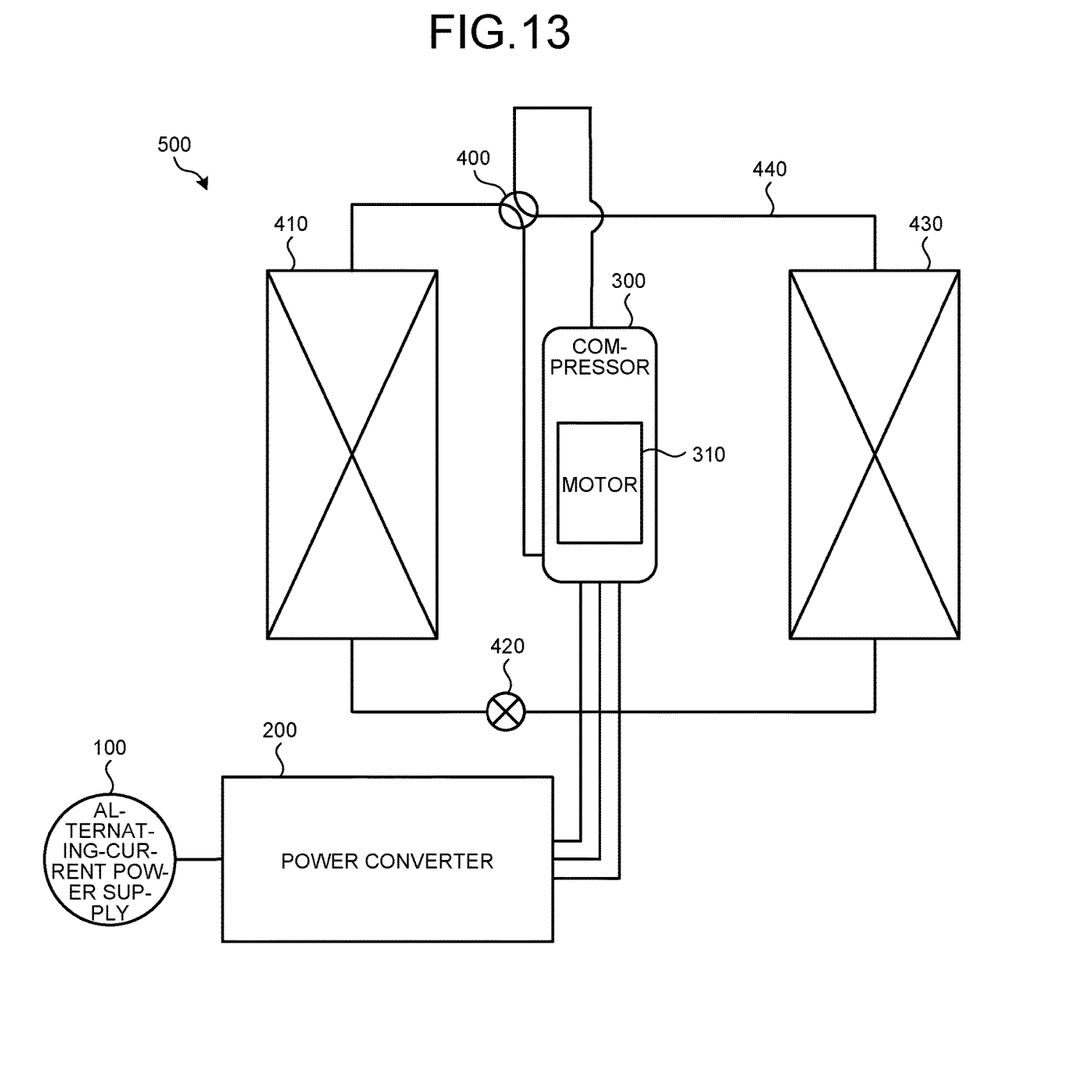
FIG. 13 is a diagram illustrating a configuration example of an air conditioner according to a second embodiment.

FIG. 13 is a diagram illustrating a configuration example of an air conditioner 500 according to the second embodiment. The air conditioner 500 includes: the alternating-current power supply 100; the power converter 200; the compressor 300 including the motor 310; a four-way valve 400; an outdoor heat exchanger 410; an expansion valve 420; an indoor heat exchanger 430; and a refrigerant pipe 440. In FIG. 13, the compressor 300, the four-way valve 400, the outdoor heat exchanger 410, the expansion valve 420, and the indoor heat exchanger 430 are connected via the refrigerant pipe 440. The motor 310 that operates a compressor mechanism (not illustrated) is provided inside the compressor 300. The motor 310 has a configuration including a stator and a rotor. The motor 310 is a compressor motor that is driven by receiving the second alternating-current voltage generated by the power converter 200 and having desired voltage and frequency. When the motor 310 inside the compressor 300 rotates to compress a refrigerant inside the compressor 300, and the refrigerant circulates between the outdoor heat exchanger 410 and the indoor heat exchanger 430 via the refrigerant pipe 440, the air conditioner 500 can perform air conditioning control. The power converter 200 and the motor 310 are electrically connected, and the power converter 200 is connected to the alternating-current power supply 100. The power converter 200 generates an alternating-current voltage to be supplied to the motor 310 by using a first alternating-current voltage supplied from the alternating-current power supply 100.

In this way, the power converter 200 is installed in the air conditioner 500, but this is an example, and the present disclosure is not limited thereto. The power converter 200 can be applied to a product including a refrigeration cycle, such as a refrigerator, a freezer, or a heat pump water heater, in addition to the air conditioner 500.

The configurations illustrated in the above embodiments illustrate one example and can be combined with another known technique, and it is also possible to combine embodiments with each other and omit and change a part of the configuration without departing from the subject matter of the present disclosure.

REFERENCE SIGNS LIST 100 alternating-current power supply; 200 power converter; 210 rectifier circuit; 211, 262 diode; 220 reactor; 230 capacitor; 240 voltage detector; 250 current detector; 260 inverter; 261 switching element; 270 controller; 280 switching unit; 281 switch; 300 compressor; 310 motor; 311 winding wire; 400 four-way valve; 410 outdoor heat exchanger; 420 expansion valve; 430 indoor heat exchanger; 440 refrigerant pipe; 500 air conditioner.

The invention claimed is:
1. A power converter comprising:
a non-boost rectifier circuit configured to convert a first alternating-current voltage into a direct-current voltage;
a reactor connected to the rectifier circuit;
a capacitor configured to smooth the direct-current voltage;
an inverter connected in parallel to the capacitor, and configured to:
    convert the smoothed direct-current voltage into a second alternating-current voltage having desired voltage and frequency; and
    output the second alternating-current voltage to a motor; and
a controller configured to control an operation of the inverter,
wherein
capacitances of the reactor and the capacitor are set such that a resonance frequency of a filter circuit is smaller than a first electrical angular frequency, the filter circuit comprising the reactor and the capacitor, the first electrical angular frequency being based on a voltage command when the controller controls an operation of the inverter such that the second alternating-current voltage is maximized in a range not causing overmodulation, and
capacitances of the reactor and the capacitor are set such that the resonance frequency is smaller than the first electrical angular frequency that is a six-fold component of a second electrical angular frequency, the second electrical angular frequency being determined using a rotation speed of the motor and a number of pole pairs of the motor when the second alternating-current voltage is maximized in a range not causing overmodulation with the voltage command in a sinusoidal wave mode controlled by the controller.

2. The power converter according to claim 1, wherein capacitances of the reactor and the capacitor are set such that the resonance frequency at maximum is smaller than the first electrical angular frequency, the resonance frequency at maximum being assumed in consideration of variations in capacitances of the reactor and the capacitor.

3. The power converter according to claim 1, wherein capacitances of the reactor and the capacitor are set such that a frequency band in a range including the resonance frequency and having a gain of zero decibel or more is smaller than the first electrical angular frequency.

4. The power converter according to claim 1, wherein a setting of capacitances of the reactor and the capacitor is configured to be changed by changing at least one of an induced voltage characteristic of the motor, a number of winding turns of a winding wire included in the motor, and a stacking thickness of an iron core included in the motor.

5. An air conditioner comprising the power converter according to claim 1.

* * * * *